(12) United States Patent
Tsapov (10) Patent No.: US 8,831,962 B1
(45) Date of Patent: Sep. 9, 2014

(54) SYSTEM METHODS AND SOFTWARE FOR HANDLING TITLE INSURANCE INFORMATION AND RELATIONSHIPS

(71) Applicant: Andrey Tsapov, Maple Grove, MN (US)

(72) Inventor: Andrey Tsapov, Maple Grove, MN (US)

( * ) Notice: Subject to any disclaimer, the term of this patent is extended or adjusted under 35 U.S.C. 154(b) by 0 days.

(21) Appl. No.: 13/919,723

(22) Filed: Jun. 17, 2013

Related U.S. Application Data (60) Provisional application No. 61/660,083, filed on Jun. 15, 2012.

(51) Int. Cl.
   *G06Q 40/08* (2012.01)
(52) U.S. Cl.
   CPC ..................... *G06Q 40/08* (2013.01)
   USPC ........................................... 705/4
(58) Field of Classification Search
   CPC ...................................... G06Q 40/08
   USPC ...................................... 705/35, 4
   See application file for complete search history.

(56) References Cited

U.S. PATENT DOCUMENTS

2004/0196856 A1* 10/2004 Bondarenko et al. .... 370/395.52
2007/0050285 A1* 3/2007 Freeman .................. 705/38

OTHER PUBLICATIONS http://www.complaintsboard.com/complaints/geico-auto-insurance-c2821.html 2007-2010.*
https://web.archive.org/web/20111219105533/http://easytitlequote.com/howitworks.asp ("EasyTitleQuote") Dec. 19 2011.*

* cited by examiner

*Primary Examiner* — James A Vezeris
(74) *Attorney, Agent, or Firm* — Fantastic IP Consulting; Eduardo E. Drake (57) ABSTRACT

To save mortgage originators and real estate professionals time and money in working with title insurance companies and to ensure consistent and efficient compliance with consumer protection laws, the present inventor devised, among other things, systems, methods, and components that facilitate the selection, offering, and/or processing of title insurance and real estate closing-cost documentation. One exemplary system provides a specialized quote engine and a database of title companies and their fee structures, enabling real estate agents, mortgage originators and consumers to rapidly identify and select among a set of available title companies for specific prospective real estate transactions based on prices and other relevant criteria, such as agent or loan originator title-company preferences, and/or title-company promotional offers. Additionally, the exemplary system automatically generates consumer-protection documents, such as Good Faith Estimate (GFE) and Truth-In-Lending (TIL) disclosure documents, saving mortgage originators considerable time and effort in producing these important consumer-protection documents.

20 Claims, 11 Drawing Sheets

Title Charges Estimate

710

Scenario:

| | | | |
|---|---|---|---|
| Company | Knight Barry Title, Inc. | | |
| Transaction Type | Residential Sale | State | Minnesota |
| Cash Purchase | No | County | Aitkin |
| Property Type | Detached | Mortgage Type | Fixed |
| Sales Price | $500,000.00 | Number of Documents | 2 |
| Mortgage Amount | $450,000.00 | Owner's Coverage | Included |

720

Buyer Charges:

| | |
|---|---|
| Endorsement Charges | |
| Total Endorsement Charges (GFE#4) | $0.00 |
| Lender's Title Policy Charge (GFE#4) | $1,100.00 |
| Owner's Title Policy Charge (GFE#5) | $312.50 |
| Other Title Charges | |
| Closing Fee | $225.00 |
| Title Charges–Purchase | $550.00 |
| Total Other Title Charges (GFE#4) | $775.00 |
| Total of All Title Charges | $2,187.50 |

730

Seller Charges:

| | |
|---|---|
| Seller Charges | |
| Total of All Seller Charges | $0.00 |

Note #1: Governmental charges are separate from title charges and are set by law and are mandatory for all transactions.
Note #2: In case the Seller refuses to pay some or all of Seller Charges listed above, such fees/charges should be added to GFE#4 and paid by ( Back To Results )   ( Generate Prelim. HUD-1 )

ChooseYourTitle.com                                                                                          Page 1 of 1

Quote #16039-79743

| | | | |
|---|---|---|---|
| Borrower: | John Johnson | Prepared For: | Waterstone Mortgage Corporation |
| Co-borrower: | | Quote Date: | 04/19/2012 |
| | | Expiration Date: | 06/18/2012 |

| | | | |
|---|---|---|---|
| Company: | Premier Title Insurance Agency, Inc. | | |
| | (Phone) 952-842-8489 (Fax) 952-842-8492 | | |
| | (E-mail) hchristensen@premtitle.com | | |
| | (Address) 7300 Metro Blvd, Ste 300, Edina, MN 55439 | | |
| Underwriter: | Fidelity | | |
| Transaction Type: | Residential Sale | State: | Minnesota |
| Cash Purchase: | No | County: | Hennepin |
| Property Type: | Detached | Mortgage Type: | |
| Sales Price: | $200,000.00 | Number of Documents: | |
| Mortgage Amount: | $160,000.00 | Owner's Coverage: | |
| Property Address: | 1234 ChooseYourTitle Drive, Minneapolis, MN | | |

| Endorsement Charges | | Seller Charges | | |
|---|---|---|---|---|
| Total Endorsement Charges (GFE#4) | $0.00 | Title Search | $250.00 | |
| Lender's Title Policy Charge (GFE#4) | $522.50 | Title Exam | $130.00 | |
| Owner's Title Policy Charge (GFE#5) | $234.00 | Assessment Search | $30.00 | |
| Other Title Charges | | Total of All Seller Charges | | $410.00 |
|    Closing Fee | $250.00 | | | |
|    Plat Drawing and Review | $60.00 | | | |
|    Name Search and Review | $25.00 | | | |
|    Courier/wire and Processing (1 packages) | $20.00 | | | |
|    Recording Service (2 documents) | $40.00 | | | |
| Total Other Title Charges (GFE#4) | $395.00 | | | |
| Total of All Title Charges | $1,151.50 | | | |

Note #1: Governmental charges are separate from title charges and are set by law and are mandatory for all transactions
Note #2: Quote guaranteed before Expiration Date
Note #3: In case if seller refuses to pay some or all of Seller Charges listed above, such fees/charges should be added to GFE#4 and paid by buyer

SYSTEM METHODS AND SOFTWARE FOR HANDLING TITLE INSURANCE INFORMATION AND RELATIONSHIPS

RELATED APPLICATION

The present application claims priority to U.S. Provisional Application 61/660,083, which was filed Jun. 15, 2012, and which is incorporated herein by reference in its entirety.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright © 2012, ChooseYourTitle.com, LLC.

TECHNICAL FIELD

Various embodiments of the present invention concern the real estate industry, specifically title insurance and mortgage loans, and more specifically systems, methods, and interfaces for providing title insurance pricing information and closing cost estimates.

BACKGROUND

In the sale of residential and commercial property, more generally real estate, it is common for buyers and mortgagors to purchase title insurance, a special type of insurance that protects buyers and mortgage banks from financial losses that stem from defects in the title (ownership records) of property. The pricing of title insurance is one of a host of items that affect the closing costs of real estate transactions.

In recent years, the mortgage banking industry came under fire for allegedly baiting prospective home buyers with low closing-cost estimates and then presenting higher closing costs at the closings, a time when many buyers were invested in completing the transaction and likely to pay the higher costs rather than delay the transaction to find a lower cost title company or different mortgage bank. Moreover, in some instances, title companies were affiliated with or otherwise quietly collaborating with the mortgage banks in a manner that suggested consumers were being treated unfairly.

To protect consumers, laws were enacted not only to require that mortgage banks allow consumers to choose which title companies they use, rather being required to take the one provided by the bank, but also to ensure greater accuracy in closing-cost estimates generally and title-insurance estimates particularly. Indeed, the laws can result in mortgage companies being held liable for excessive underestimation of closing costs.

As the mortgage and real estate industries have adapted to the new regulations, the present inventor has recognized at least three problems. One is that choosing a title insurance company is a complex endeavor and many consumers, even with the power of Internet search engines, such as the GOOGLE™ search engine, are not well equipped to distinguish one from another in terms of quality of product or experience. Two is that mortgage loan officers are now engaging with wider variety of title insurers than previously, some of which they may not have trusted relationships and which may put them at risk of being liable for the title insurance estimation errors. Indeed some mortgage banks make individual loan officers responsible for payment of the amount of any excessive underestimation. Three is that the business of title insurance is more competitive than ever. Although this is good news for consumers, it poses challenges to title insurance companies seeking to maintain or grow their businesses.

Accordingly, the present inventor has recognized a need to improve how consumers select title insurance companies, how loan originators work with title insurance companies, and how title insurance companies compete for business.

SUMMARY

To address one or more of these and/or other needs, the present inventor devised, among other things, one or more systems, methods, and components that facilitate the selection, offering, and/or processing of title insurance and real estate closing-cost documentation. One exemplary system includes an internet-based search engine and a database of title companies and their fee structures. The exemplary system enables real estate agents, mortgage originators and consumers to rapidly identify and select among a set of available title companies for specific prospective real estate transactions based on prices and other relevant criteria, for example agent or originator title-insurance preferences, and/or promotional offers from title companies. Additionally, the exemplary system automatically generates consumer-protection documents required by the Real Estate Settlement Procedures Act (RESPA), such as the Good Faith Estimate (GFE) and Truth-In-Lending (TIL) disclosure documents, saving mortgage originators considerable time and effort in producing these important consumer-protection documents.

In many instances, any inaccuracy of the information in these documents, for example, underestimated title insurance expense, exposes the mortgage loan officer or originator to a risk of violating RESPA and to covering the cost of the error. Thus, to promote accuracy and minimize financial risk to mortgage originators, who are now required to bear the direct and indirect cost of closing-cost-estimation errors, the exemplary system uniquely requires that title companies guarantee the fee data that they upload to the system.

BRIEF DESCRIPTION OF THE DRAWINGS

FIG. 8 is a facsimile of an exemplary detailed title insurance quote document and quote registration number corresponding to one or more embodiments of the present invention.

DETAILED DESCRIPTION OF EXEMPLARY EMBODIMENTS

This document describes one or more specific embodiments of an invention, which may one or more separately inventive aspects. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Exemplary System

Figure 1:
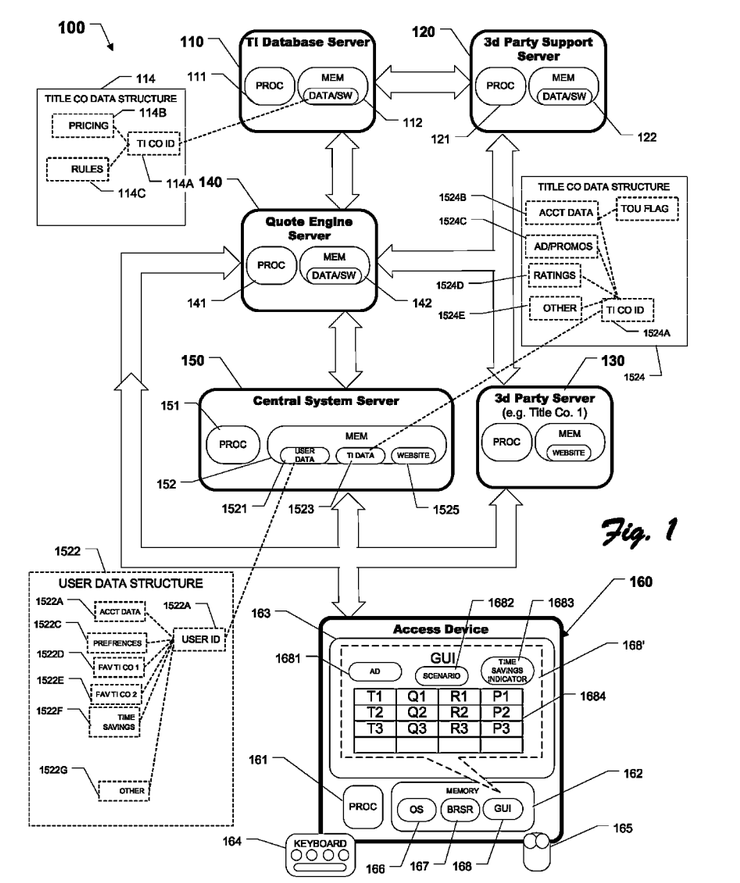
FIG. 1 is a block diagram of an exemplary title insurance information and relationship management system which corresponds to one or more embodiments of the present invention.

FIG. 1 shows an exemplary title insurance system 100, including a variety of components interconnected via wired or wireless local or wide-area network, such as the Internet. More specifically, system 100 includes a database server 110, a third-party support server 120, third-party web servers 160, a quote engine server 140, a central system server 150, and network access devices 160.

Database server 110, which is representative of one or more servers, includes one or more processing units 111 and memory modules 112. The memory modules store, among other things, raw or base pricing information for one or more title insurance companies and/or insurance underwriters, as well as volume pricing tier structures for select mortgage companies and real estate agencies which have contractual relationships with owners or operators of system 100. In the exemplary embodiment, the data is stored in the form of one or more data structures, such as exemplary data structure 114 which includes an company identifier 114A for a particular title insurance company logically associated with one or more pricing information fields 114B for the particular title insurance company and one or more business rules 114C governing selection of insurance underwriters, and so forth. (In some embodiments, this data is stored separately as part of the title company data in server 150.)

Third-party support server 120, which is also representative of one or more servers, includes one or more processing units 121 and one or more memory modules 122. Memory modules 122 include machine-readable and executable instructions for enabling and managing communications between database server 110 and third-party title-insurance-company servers 160.

Third-party title-insurance-company server 160 include one or more servers which are owned, controlled, or leased by respective title insurance companies, each including one or more processing units 161 and one or more memory modules 162. The memory modules include machine-readable and executable instructions and data for defining one or more publicly accessible title-insurance company websites, such as a representative website (online graphical user interface) 163.

Quote engine server 140, which is also representative of one or more servers, includes one or more processing units 141 and one or more memory modules 142. Memory 142 include one or more sets of machine-readable data and machine-executable instructions for building or generating title insurance quotations for one or more title insurance companies based on title insurance pricing information from database server 110 and prospective real estate transaction data entered by users through server 150 and/or access devices 160, 170, and 180.

Central system server 150, which is representative of one or more servers, includes one or more processing units 151 and one or more memory units 152. Memory 152 includes a user data module 1521, title insurance company data module 1523, and an online graphical user interface (website) module 1525.

User data module 1521 includes one or more sets of machine-readable data and machine executable instructions for enabling users to input, change, and interact with their user data. In the exemplary embodiment, the user data includes one or more data user data structures, of which exemplary user data structure 1522 is representative. User data structure 1522 includes a user identifier 1522A for a mortgage loan officer or originator or a real estate agent that is logically associated with one or more data fields or objects 1522B-F.

Field 1522B includes account related data items, such as user name, password, name, address, credit card information, age, date of birth, and gender. Field 1522C includes one or more user preference regarding default operation of the system for the user, such as maximum number of title companies to include a results lists, or whether to display quote prices directly in the list or only after clicking on or hovering over a title company, or whether to display system user ratings of a title insurance company by default.

Fields 1522D and 1522E include respectively the identity of first and second favored or preferred title insurance company for the associated user. This field can also include internal contacts for the title company that the user has worked directly with, notes on the company made by the user, a running count of title insurance policies that the company has handled for the user, the date of the last X (for example, 3, 4, or 5) insurance policies, etc. Some embodiments allow users to identify more than two favorite or preferred title insurance companies.

Field 1522F includes information related to the time savings experienced by the user in using the exemplary system. For example, if it is estimated that users may experience 2 hours of aggregate time savings in gathering quotes from a set of 5 or 10 title companies and from creating a closing-estimate document relative to the time it would take to perform those activities using conventional techniques, then each time the user uses the system to perform such tasks, his or her aggregate time indicator would be incremented by 2 hours. Some systems survey the users as to their estimate of the actual time spent doing these activities, and based their respective aggregate time savings indicators based on their self-reported time estimates. (Aggregate or cumulative time savings metrics can then be computed for the entire system by adding up the savings across all users. Field 1522G includes other user information, for example customer relationship management (CRM) information to enable users to measure, track, and manage their relationships with title insurance companies.

Title insurance company data module 1523 includes one or more sets of machine-readable data and machine executable instructions for enabling title-company users or authorized system administrators to input, change, and interact with title insurance company data used in operation of the exemplary system. To this end, module 1523 includes a number of title insurance company data structures, of which exemplary title insurance company data structure 1524 is representative. Data structure 1524 includes a title insurance company identifier 1524A for a title insurance company and the identifier is logically associated with one or more data fields or objects, such as an account data field 1524B, an advertising data field 1524C, a ratings data field 1524D, and other information field 1524E.

Field 1524B includes account related data items, such as user name, password, name, address, credit card or bank account information, and system usage history. In the exemplary embodiment, field 1525B also includes a Terms-Of-Use (TOU) or quote guarantee flag or indicator indicative of whether the title company has agreed to honor or guarantee its title insurance pricing quotes as provided by the system for a predetermined time period, such as 60 days. In some embodiments, the title companies may indicate different period of time for the guarantee, such as 30 days.

Field 1524C advertising and promotional information or pointers to such data that is used to control and define presentation of advertising and promotional offers from the title insurance company on the system website (as defined by module 1525). Examples of such data include banner advertising images, campaign presentation schedules and/or conditions, and advertising budgets. Some embodiments allow title companies to target users of certain mortgage banks or real estate companies with specific offers in which case field 1524C would include information as to these promotional conditions. Still other embodiments allow title companies to target or exclude certain prospective real estate transactions, for example, those value less than or greater than a threshold amount, such as one million dollars, or between two dollar amounts. Some allow title companies to exclude themselves from search results for particular real estate agents or loan originators or officers, and/or particular geographic regions. Generally, the exemplary system allows title insurance company users to target or detarget advertising or to emphasize (higher on result list) or de-emphasize their placement (lower on or excluded from result list) based on identify or classification of user and/or based on one or more of the real estate transaction parameters.

Ratings data field 1524D includes data indicating performance or ratings for the respective title companies, such as timeliness in meeting closing deadlines or related milestones. In the exemplary embodiment, this data includes ratings from individual users as well as aggregations of those ratings, for example, an average of the ratings, enabling the system website (described below) to display both aggregate and individual ratings. In some embodiments, this data is read-only with respect to the title insurance companies, and in some embodiments, title insurance companies have the rights to delete or to mark certain reviews as "do not display."

Other data field 1524E provides other data that title insurance companies may find useful in understanding market dynamics. For example, some embodiments also include system usage metrics which count how many times the title insurance company has appeared in response to user quote requests, how many times its quote details have been viewed by users, how many times their quotes have been the highest or lowest in a set of quotes, and the number of Website module 1525 includes one or more sets of machine-readable data and machine executable instructions for defining an online graphical user interface, e.g. for a hypertext markup language (HTML) or other functionally similar technology for interactively presenting and receiving data over a local or wide-area-network on a variety of access devices in a form or manner that achieves one or more of the exemplary features or functions described herein. In the exemplary embodiment, website module 1525 generally supports user searching for relevant title insurance companies based on prospective real estate transaction scenarios or real estate closing scenarios; generating and presenting title insurance quotes for those scenarios; presenting advertising, promotional offers, and user review information for title insurance companies; generating and distributing closing-cost estimate documentation based on selected title insurance quotations; solicitation and presentation of user performance ratings and reviews of title insurance company services; presentation of aggregate and user specific time-saving indicators; and/or access to and update of user and title company related system information.

Network access device 160, which is shown in communication with 3d party server 160, quote engine server 140, and/or central system server 150, is generally representative of one or more access devices. In the exemplary embodiment, access device 160 takes the form of a personal computer, workstation, personal digital assistant, mobile telephone, or any other device capable of providing an effective user interface with a server or database. Specifically, access device 160 includes a processor module 161, a memory 162, a display 163, a keyboard 164, and a graphical pointer or selector 165.

Processor module 161 includes one or more processors, processing circuits, or controllers. In the exemplary embodiment, processor module 161 takes any convenient or desirable form. Coupled to processor module 161 is memory 162.

Memory 162 stores code (machine-readable or executable instructions) for an operating system 166, a browser 167, and a graphical user interface (GUI) 168. In the exemplary embodiment, operating system 166 and browser 167 take on any convenient or desirable form. Operating system 166 and browser 167 not only receive inputs from keyboard 164 and selector 165, but also support rendering of GUI 168 on display 163, as originally defined and controlled by website module 1525 (or a similar module within 3d party server 130 or quote engine server 140).

Upon rendering, GUI 168, shown on display as GUI 168', presents data in association with one or more interactive control features (or user-interface elements). (The exemplary embodiment defines one or more portions of interface 168 using applets or other programmatic objects or structures from servers 130, 140, or 150 to implement the interfaces shown above or elsewhere in this description.) In the exemplary embodiment, each of these control features takes the form of a hyperlink or other browser-compatible command input, and provides access to and control of various regions of the graphical user interfaces described herein.

More particularly, GUI 168 (rendered as GUI 168' on display 163) includes an ad display region 1681, a real-estate transaction scenario region 1682, a results region 1683, and time-savings indicator region 1684. Ad display region 1681 displays advertising content for one or more title insurance companies as defined in title insurance company data module 1523. Real estate transaction scenario region 1682 displays and/or allows users to define a real estate transaction scenario. Results region 1683 presents a listing of one or more title insurance companies based on quote engine server 140 running a search of title insurance database 110 and generating quotes based on the results of that search.

More specifically, results region 1683 displays a list of one or more selectable title insurance company identifiers, for example, T1, T2, and T3, in association with respective selectable title insurance price quotes, for example Q1, Q2, and Q3; respective selectable title insurance company ratings or performance measures, such as R1, R2, and R3; and respective selectable promotional offers to incentivize users to choose the associated title insurance company. In some embodiments the performance measures are an average of ratings given by consumers, real estate agents, and/or mortgage loan officers. Ratings, for example, a 5-star rating system, can be based on subjective and/or objective criteria collected during, before, or after closing events. Ratings can also be based on total number of title insurance policies sold during a predetermined time period, or over the life of the company. Other objective criteria such as years in business, number of employers may also be used. In the exemplary embodiment, the title insurance companies are listed in a random order, with the exception that user preferred or favored title insurance companies are listed first. Other embodiments list the title insurance companies in rank order of lowest to highest quote price and/or highest user ratings. Some embodiments allow users to control how the system sorts the list through storage of sort preferences and/or through interactive list sorting controls at the top of each column. User selection of listed items can occur via hovering with the pointing device over the item, such as T1, Q1, R1, or P1 or clicking on the item to pull up a new page or pop-up window. Some embodiments include an indication of whether the quotes are guaranteed for a specific period of time in association with the display of the quote or its title company. The indication can be in the form of a further column in the results listing, or by displaying a given listing in a different font or background color than the others. Further details and/or extensions of GUI 168 are described below with aid of FIGS. 3-14 after a description of one or more exemplary methods of operating system 100.

Exemplary Method(s)

Figure 2:
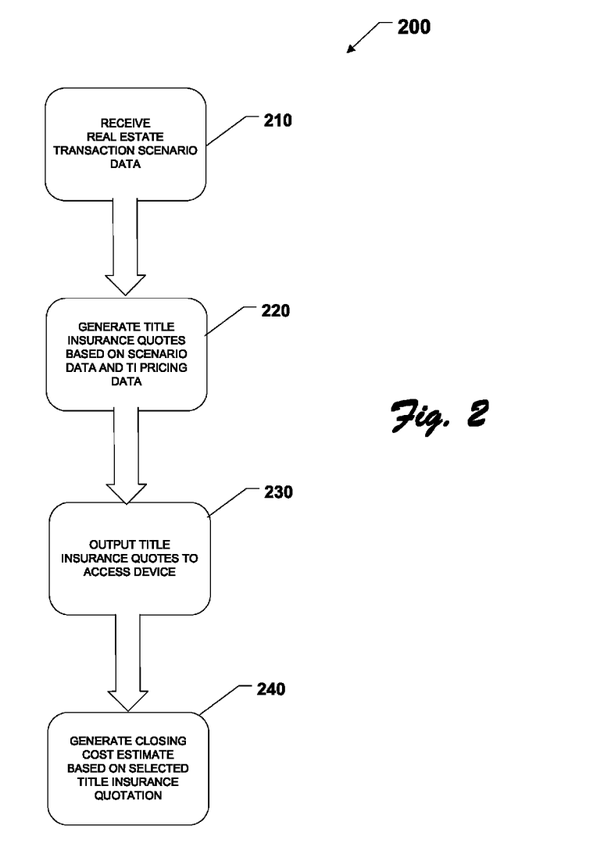
FIG. 2 is a flow chart of an exemplary method of operating a title insurance information and relationship management system of FIG. 1, and which corresponds to one or more embodiments of the present invention.

FIG. 2 shows a flow chart 200 of one or more exemplary methods of operating an ecommerce and product recommendation system, such as system 100. Flow chart 200 includes blocks 210-240, which are arranged and described in a serial execution sequence in the exemplary embodiment. However, other embodiments are not similarly limited. Moreover, still other embodiments implement the blocks as two or more interconnected hardware modules with related control and data signals communicated between and through the modules. Thus, the exemplary process flow applies to software, hardware, and firmware implementations.

At block 210, the exemplary method begins with receiving one or more portions of a real estate transaction closing scenario. In the exemplary embodiment, this entails a user accessing the exemplary system via an access device, such as access device 160, directing their browser to a URL (Uniform Resource Locator) corresponding to the system website (hosted for example by system server 150 or 3d party server 130) and logging in as an existing registered user with appropriate login credentials and authentication. (In some embodiment, login is not required or is handled transparently.) The user may then input information defining a real estate transaction scenario. In the exemplary embodiment, the scenario information, includes one or more borrower names, transaction type (purchase or finance), cash purchase indication (yes or no), mortgage type (fixed, ARM, fixed balloon, or ARM), owner's coverage (included or excluded), sale price, mortgage amount, property type (detached, attached, PUD, condominium, cooperative, manufactured home), state where property located, country, property address, indication of whether closing needs to be witnessed or not (yes or no), number of documents to record (1-10 selection), and number of packages (1-10 selection). In some embodiments, one or more portions of the scenario information may already be defined by the system, for example, via user or system determined default values or preferences, or one or more portions may be defined based on transactional parameters defined for a particular property. Execution then continues at block 220.

Block 220 entails generating one or more title insurance pricing quotations based on the received scenario information. In the exemplary embodiment, this entails communicating the scenario information from central system server 150 to quote engine server 140. In response, quote engine server 140 defines and communicates one or more queries to title insurance database 110, which returns the information enabling the quote engine server to define one or more title insurance quotations for one or more corresponding title insurance companies. The quote engine server then defines the quotations and communications them to central system server 150.

Block 230 entails outputting the title insurance quotations to an access device. In the exemplary embodiment, this entails sorting the quotations based on system default sorting procedures and/or user sorting preferences and presenting the sorted list to an access device, such as access device 160, for display. In some embodiments, the list is sorted by first listing the quotations from any title insurance companies preferred or favored by the user, and then listing the remaining quotations in a random or rank order based on pricing or title company ratings. Execution then continues at block 240.

Block 240 entails generating one or more closing-cost estimates documents. In the exemplary embodiment, this entails a user selecting one of the quotations or corresponding title companies using a mouse or other form of selection and then selecting a command button to invoke generation of the closing-cost estimate in the form of preliminary HUD-1 or other Truth-In-Lending document. Upon generating the documents, the exemplary embodiment defines a quotation number for the quotation and binds it to a list or registry of guaranteed quotations, if the title company associated with the quotation has agreed to guarantee all "accepted" quotations or the accepted quotation conforms to predetermined criteria that the title company has agreed. Some embodiments have system terms-of-use agreements that legally bind participating title companies to guarantee accepted quotes for 60 calendar days. In some embodiments, acceptance is indicated by the user placing an order through the system for delivering of the title insurance, in which case an order number is created. At this juncture, some embodiments also update the time saving metrics for the user and the system as a whole.

Exemplary Graphical User Interface

Figure 3:
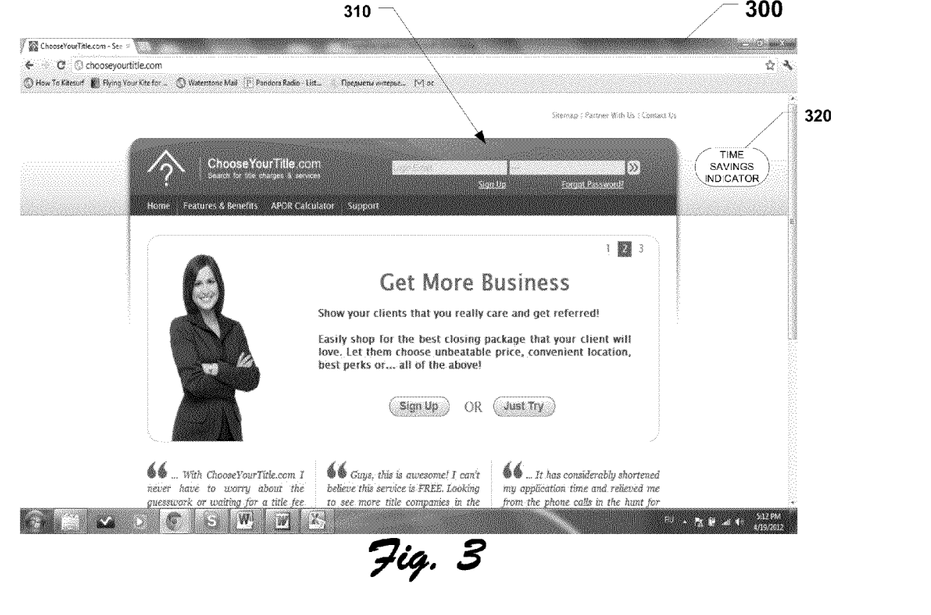
FIG. 3 is a facsimile of an exemplary home-page portion of an online graphical user interface corresponding to one or more embodiments of the present invention.

FIGS. 3-14 show additional aspects and/or extensions of GUI 168 of FIG. 1 for storage in a non-transient machine readable medium (memory) and/or display on an electronic display. In particular, FIG. 3 shows an exemplary system home page 300, which includes a login region 310 for receiving a username and password, as well as a time-savings indicator region 320 for displaying cumulative system time savings. The exemplary page also describes benefits of the system and includes "Sign Up" or "Just Try" links. In some embodiments, the time savings indicator region include one or more cumulative indicators, indicating for example an aggregate for the amount of time saved by system users or number of insured transactions, for example, all system users across the country, in a given state, and/or in a given city or metropolitan region.

Figure 4:
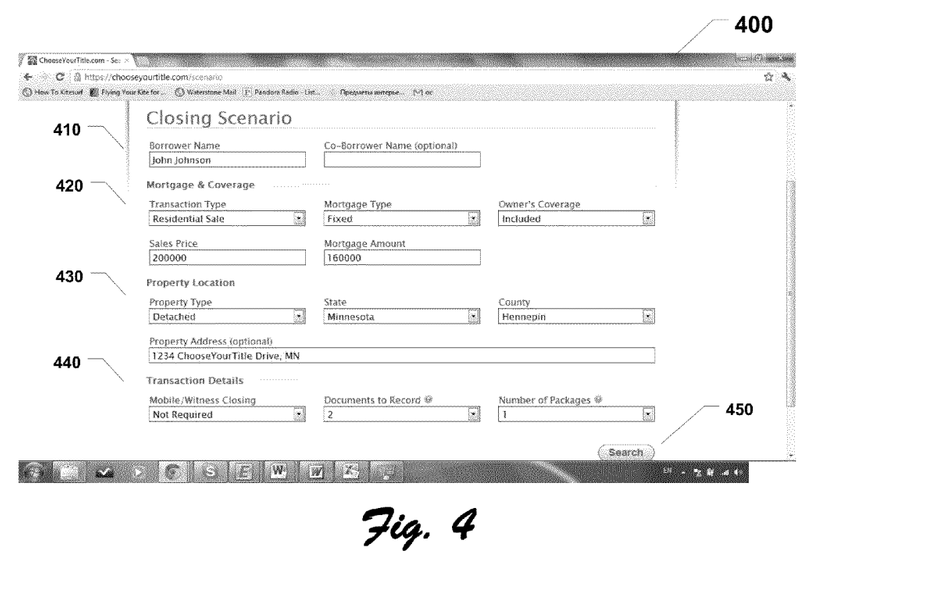
FIG. 4 is a facsimile of an exemplary scenario-definition portion of an online graphical user interface corresponding to one or more embodiments of the present invention.

FIG. 4 shows an exemplary real estate transaction scenario or closing scenario page 400 which is presented in response to successful login of a user enables a user, for example, a real estate agent or mortgage loan officer, or a borrower (prospective buyer) to enter information through a set of one or more input fields, drop-down menus or other similar techniques to define a real estate closing scenario. More specifically, scenario page 400 includes a borrower name region 410, a mortgage-coverage region 420, a property location region 430, a transaction detail region 440, and a search command button 450. Borrower name region 410 includes input fields or regions for the names of a borrower and co-borrower. Mortgage-coverage region 420 includes input regions for transaction type, mortgage type, owner's coverage, sales price, mortgage amount and cash transaction. Property location region 430 allows a user to define property type, state, county and property address. Transaction details region 440 allows a user to define Mobile/Witness Closing, Documents to Record and Number of Packages. This section may have some additional fields depending on title companies' fee structures. Some embodiments integrate with a real estate listing services, such as an MLS system, allowing a user to select property from the listing system or enter an MLS identifier associated with the property and automatically populate the closing scenario page with available information. This feature is particularly useful for real estate companies who may be engaging with a number of prospective buyers for a property and need only enter the property id or have a custom drop down menu with a list of current properties where they are the listed agent and/or a list of most recently properties for which scenarios have been defined, saving them time. Some embodiments may also automatically provide electronic records availability information for use in formulating the title insurance quote.) After a scenario is defined, the user may actuate search command button 450 to cause submission of the scenario information to quote engine server 140 via central server 150. In response, the quote server engine searches title company information database 110 for capable title companies and generates one or more title insurance quotations. Results are presented on a results page.

Figure 5:
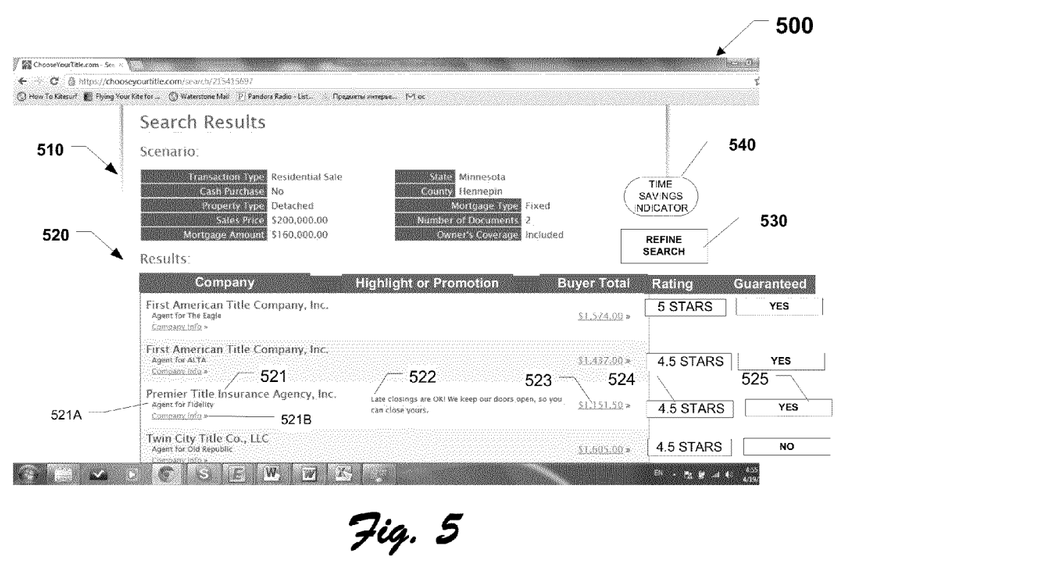
FIG. 5 is a facsimile of an exemplary search results portion of an online graphical user interface corresponding to one or more embodiments of the present invention.

FIG. 5 shows an exemplary search results page 500. Search results page 500 includes a scenario summary region 510, a results list region 520, a refine search command button 530, and a time savings indicator region 540. Scenario summary region 510 describes the details of entered search or scenario as defined in page 400. Results list region 520 includes a with list of one or more selectable title company names or identifiers, such as title company identifier 521, a corresponding selectable or nonselectable highlight or promotion 522, a selectable total quote price 523, a selectable title company user rating indicator 524, and a quote guarantee indicator 525. Under each company identifier, for example identifier 521, there is an indication 521A of what insurance underwriter the title company is using and a link 521B to a company info or profile page, such as title company page 600 in FIG. 6. Total quote price 523 indicates the total amount for title fees and charges payable by the buyer and is selectable to invoke display of a quote page 700 in FIG. 7. User rating indicator 524 indicates an average or most recent user rating of the title company, for example on a 4.5 stars out of a possible 5 stars. The rating can be selected in some embodiments to pull up details such as how many ratings the average is based on and/or to see specific ratings comments. Quote guarantee indicator 525 indicates whether the title company is guaranteeing the accuracy of the list quote. In some embodiments this may be an indicator based on whether the company has agreed to the terms-of-use of the system.

The search results, in the exemplary embodiment, are presented in random order for unregistered users. For registered users, the exemplary system stores a preferred list of one or more title companies that would always show up on top of the page. In some embodiments, the system tracks the number of times the registered user has used each listed title company as well as the dates of usage, enabling the user to better manage distribution of business across multiple preferred providers. (Some embodiments provide or integrate with relationship management systems.)

Refine search command button 530 allows users to return to the scenario page to redefine one or more aspects of the scenario and submit the refined scenario for a new set of quotes. Time savings indicator region 540 includes one or more indicators of cumulative time savings as previously described.

Figure 6:
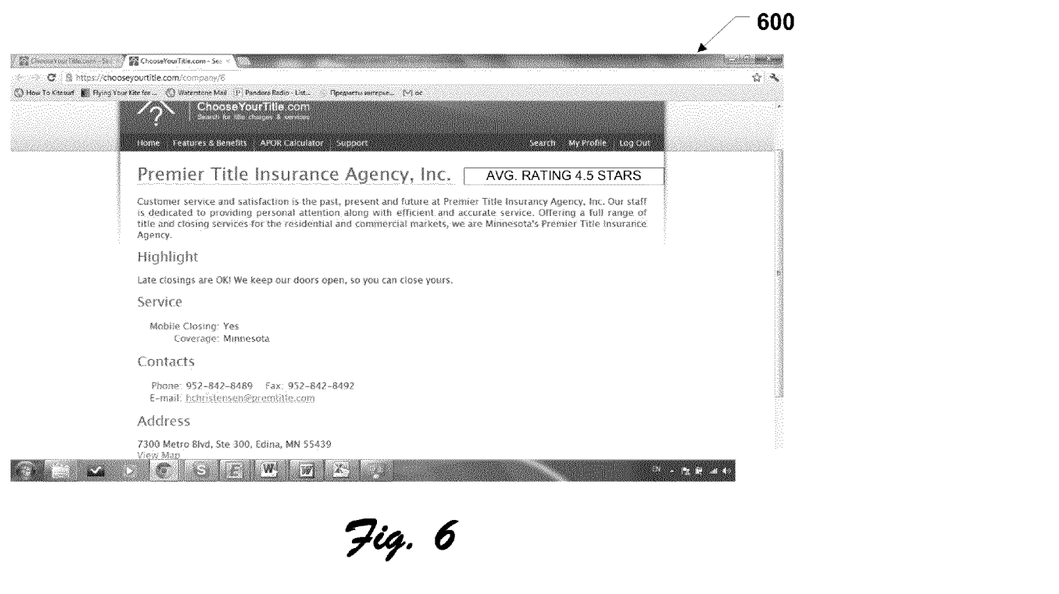
FIG. 6 is a facsimile of an exemplary title insurance company page portion of an online graphical user interface corresponding to one or more embodiments of the present invention.

FIG. 6 shows an exemplar title company profile page includes introduction, service, contacts and address regions as well as a ratings indication region. Service region includes information about whether company does mobile closing or not and specify the states the title company operates in. Contact region provides phone, fax and email information. The address region includes the address and link to view a map showing the location of the title company.

Figure 7:
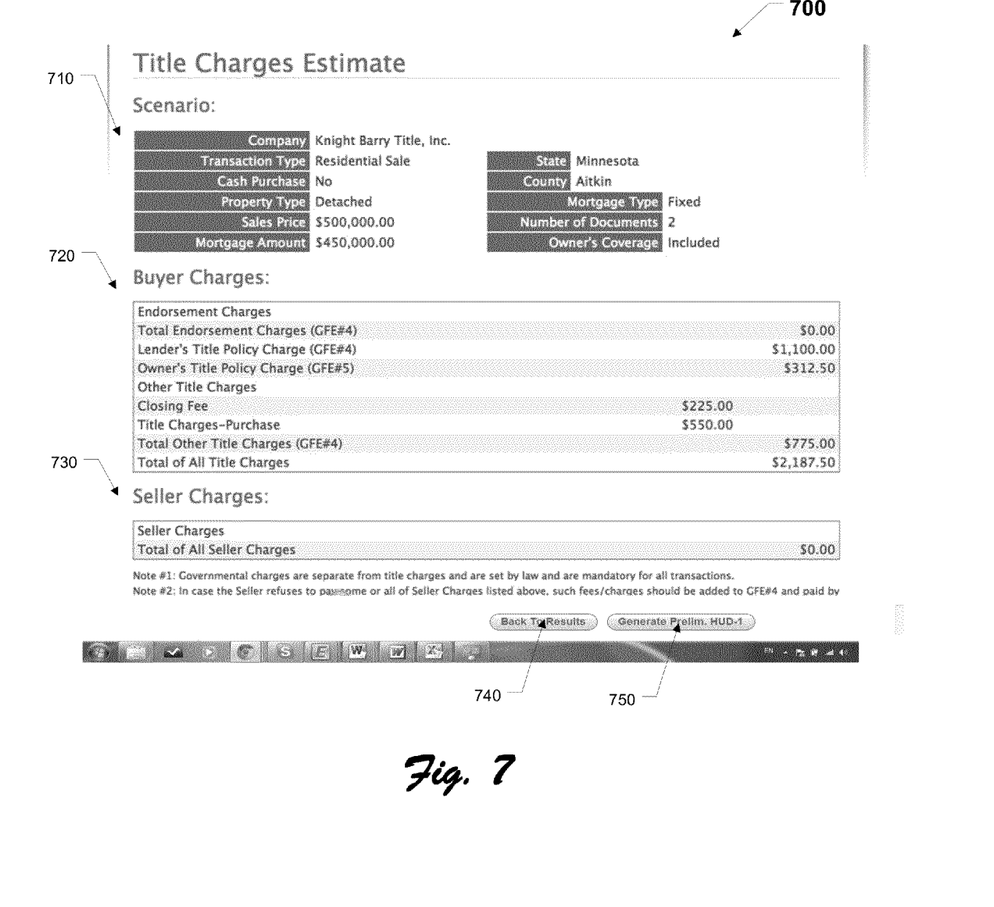
FIG. 7 is a facsimile of an exemplary detailed title insurance quote page portion of an online graphical user interface corresponding to one or more embodiments of the present invention.

FIG. 7 shows exemplary quote detail page 700, which the system presents in response to user selection of one of price quote on the search results page. More particularly, this page, which provides detailed or itemized breakdown of the selected total price, includes a scenario summary region 710 (similar to region 510), a buyer charges region 720, and a seller charges region 730. It also includes two links on the bottom of the page: "Back to Results" link 740 and "Generate Preliminary HUD-1" link 750 (more generally generate closing-estimate documents).

Figure 9:
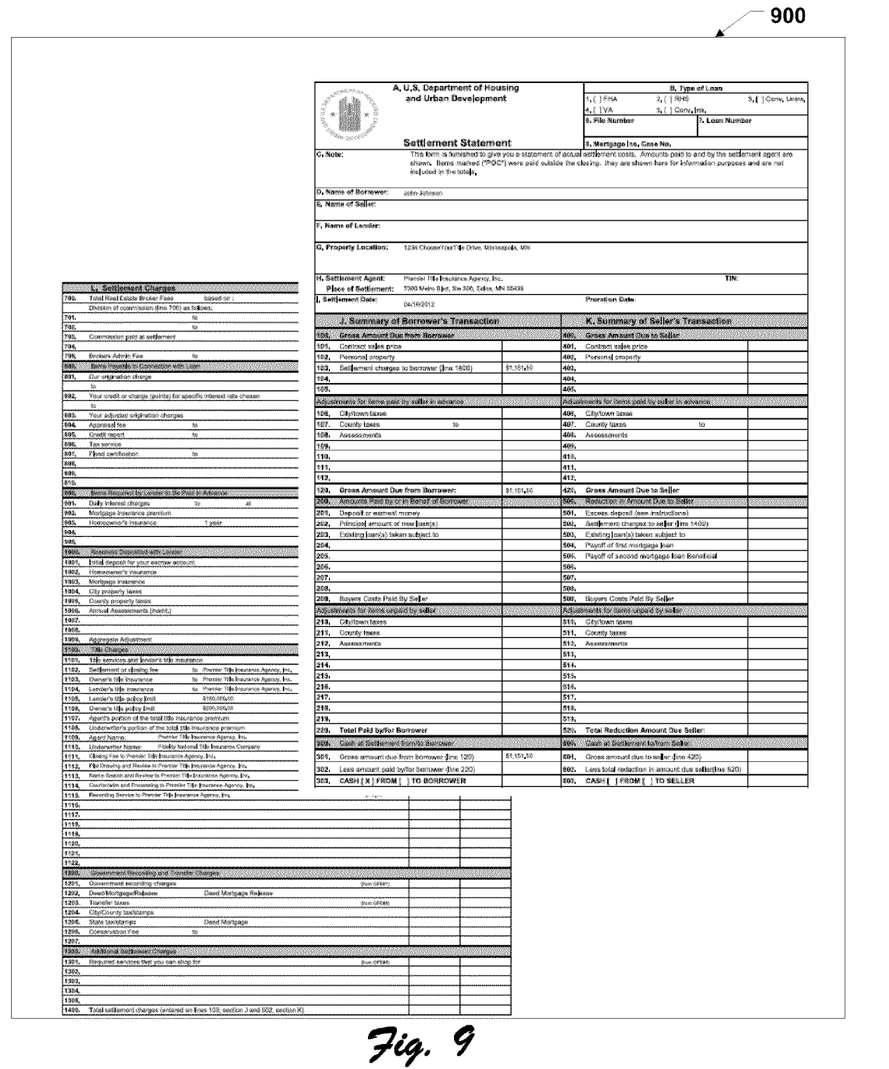
FIG. 9 is a facsimile of an exemplary HUD-1 document produced by the exemplary system and thus corresponding to one or more embodiments of the present invention.
Figure 10:
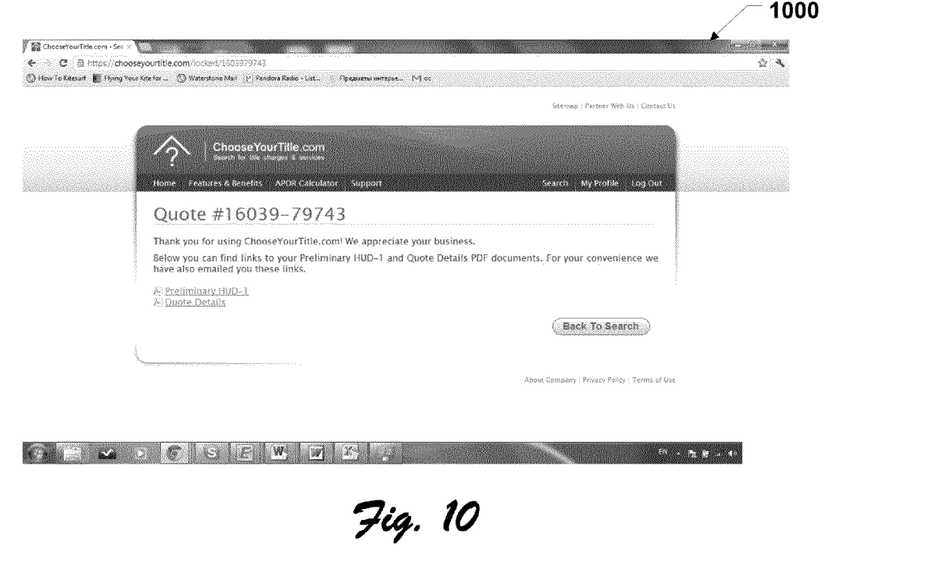
FIG. 10 is a facsimile of an exemplary quote confirmation page portion of an online graphical user interface corresponding to one or more embodiments of the present invention.

In response to selection of the "Generate Preliminary HUD-1" button, the exemplary system communicates signal to a server, which in turn sends out two e-mails (or other forms of communications): one to the title company obligating it honor or guarantee the quote for a specific time period, such as 60 days, and the other to the user including Quote Details Document and Preliminary HUD-1 documents in HTML or PDF format for example, as shown respectively in FIGS. 8 and 9. In further response, the exemplary system presents a confirmation page 1000 as shown in FIG. 10 with the quote number and links to the HUD-1 and quote details documents. (In some embodiments, the quote number is also stored in association with the user, for example as part of the other data field or object, enabling users to quickly access documents that they have generated to share with borrowers or other professionals involved in real estate transaction.) Quote Details form has quote number that is a confirmation number of the performed search that could be retrieved at any time. (In the exemplary embodiment, each page of the interface can also include search field to search for existing quote by borrower name or confirmation number to ease access to existing quotes.)

Selection of the Generate Preliminary HUD link also causes update of one or more counters, for example total count of HUDs (or accepted quotes) issued for the given title company, for the loan originator or real estate agent, and, the cumulative number of HUDs for the given title company for the loan originator or real estate agent, along with date/time stamp.

Figure 11:
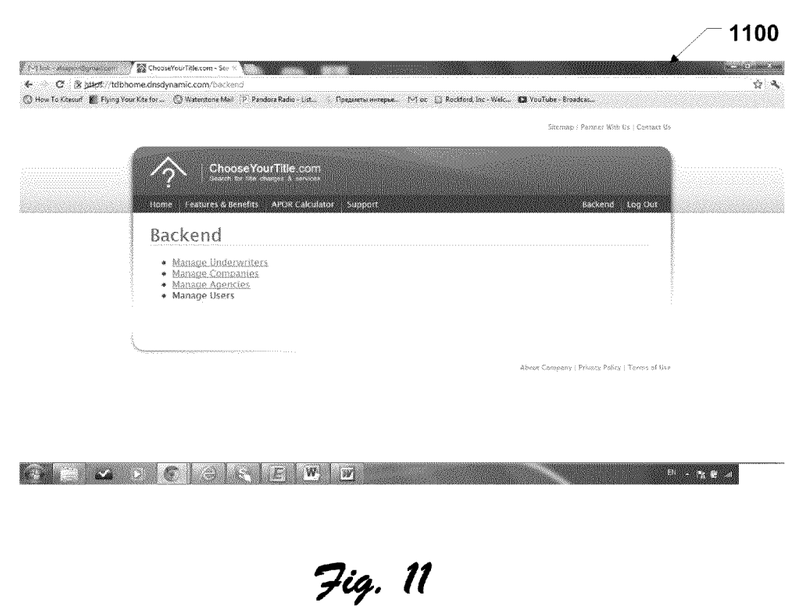
FIG. 11 is a facsimile of an exemplary backend systems access page portion of an online graphical user interface corresponding to one or more embodiments of the present invention.

FIG. 11 shows an back end access or administrator page 1100, which provides links access to other administrative pages, specifically a manage underwriters link 1110, manage title companies link 1120, a manage agencies link 1130, and a manage users link 1140.

Figure 12:
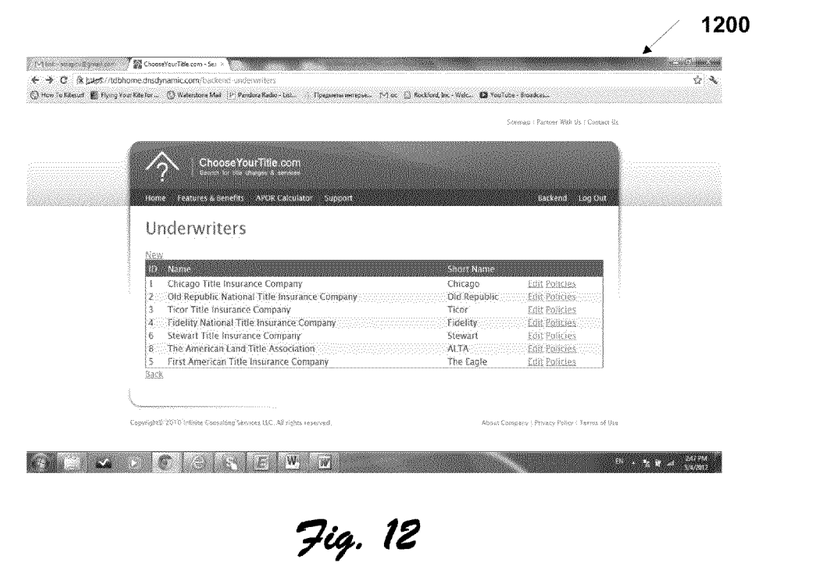
FIG. 12 is a facsimile of an exemplary underwriters page portion of an online graphical user interface corresponding to one or more embodiments of the present invention.

FIG. 12 shows an exemplary Manage underwriters page 1200 that facilitates management of insurance underwriters (the insurers that title companies use to provide lenders and owners coverage). It administers relationships with Insurance Underwriters, electronically retrieving pricing and policy information from underwriter insurance management systems or servers. In some embodiments, this retrieval and update occurs on automatic or programmatic or event-triggered basis, for example hourly, daily, weekly, or monthly, ensuring that price quotes take into account the underwriter pricing structures for changing insurance inventory and perceived risk parameters. In some embodiments, the underwriter update is done manually after received notification from an underwriter or a title company.

Figure 13:
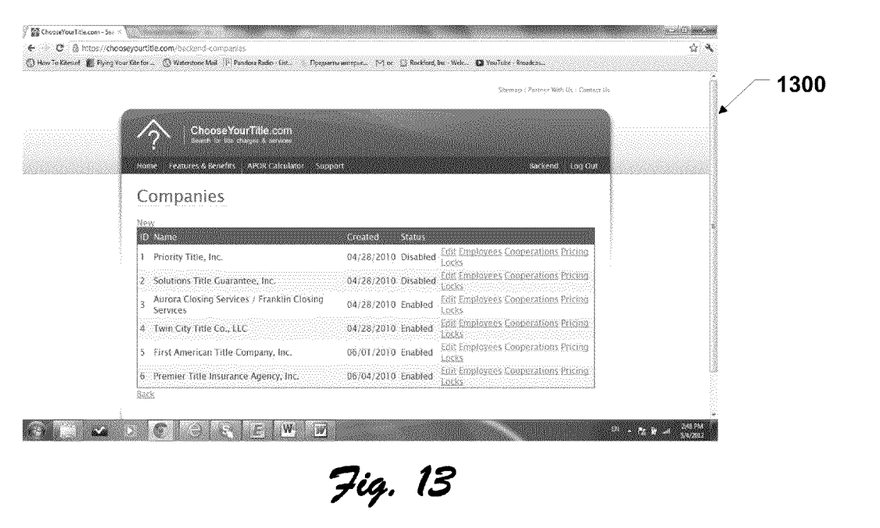
FIG. 13 is a facsimile of an exemplary title company management page portion of an online graphical user interface corresponding to one or more embodiments of the present invention.

FIG. 13 shows an exemplary Manage Title Companies page 1300 that provides administrative access of title company names, account and historical data, current status, profile edit options, authorized employee information for employees hat have access to profile editing options, associated title insurance underwriters, pricing scenarios, and list of locked fees. In the exemplary embodiment, page 1300 provides access to other pages (not shown) that have specific functionality. For example, an edit profile page provides two categories of profile access and editing functions: system and public profile sections. The system profile is intended for internal use, and includes read and/or write access to items such as contact information for ChooseYourTitle.com. pricing policies, exceptions, restrictions, analytics, user reviews display preferences etc. Public section will be displayed to users including address, contacts, promotions, about company description. An employee section lists employees that are able to access the system and make changes to title company profile and pricing. A cooperation page with Insurance Underwriters will allow listing and linking of one or more insurance underwriters to the title company for use in preparing title insurance quotes for the title company. A pricing scenarios page will allow creating pricing according to the scenario questions. Once the new scenario is selected the pricing becomes available for quotes next calendar day. Tier pricing will be designed for Title Companies able to offer to their preferred customers. In the tiers will be option to select the users that will receive referenced tier pricing. An example of tiered pricing is 10% discount for certain real estate agents or mortgage loan originators or processors. A lock page provides a complete listing of HUD-1s/locks the system has created for the selected Title Company.

Figure 14:
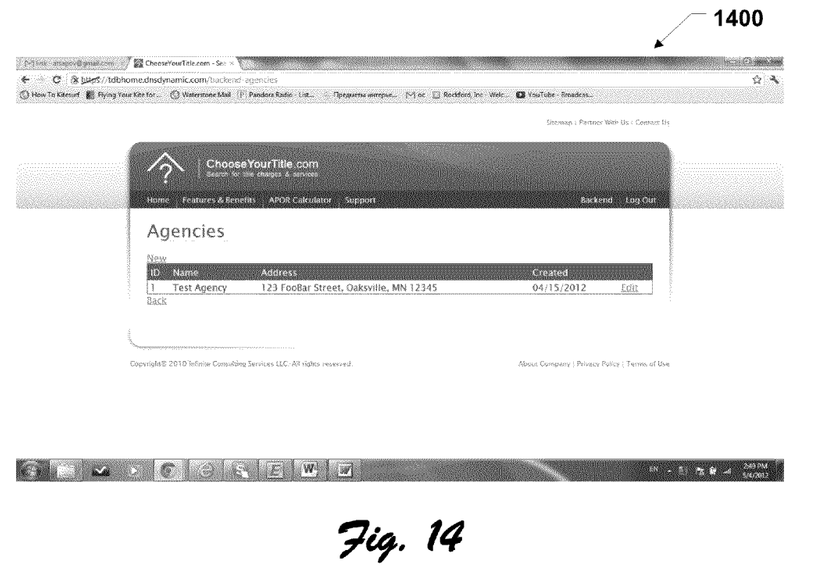
FIG. 14 is a facsimile of an exemplary branch-agency management page portion of an online graphical user interface corresponding to one or more embodiments of the present invention.

FIG. 14 shows an exemplary Braches/Agencies management page 1400. This page allows access to and editing of profiles of branches or agencies that are affiliated or subsidiary to other participating title companies. Upon request, they will be able to function as separate company with their own pricing and maintain managing rights, allowing title companies to set up sub brands that may target particular niches or geographic regions.

CONCLUSION

The embodiments described above are intended only to illustrate and teach one or more ways of practicing or implementing the present invention, not to restrict its breadth or scope. Nothing presented herein is intended to be construed as critical, required, or essential to the invention as claimed. The actual scope of the invention, which embraces all ways of practicing or implementing the teachings of the invention, is defined only by the following claims including any amendments made during pending of the application and all equivalents of those claims as issued.

It will be appreciated that some embodiments may comprise one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, some embodiments can be implemented as a computer-readable storage medium (more generally a non-transient storage medium) having computer readable code stored thereon for programming a computer (e.g., comprising a processor) to perform a method as described and claimed herein. Likewise, computer-readable storage medium can comprise a non-transitory machine readable storage device, having stored thereon a computer program that include a plurality of code sections for performing operations, steps or a set of instructions.

Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Moreover in this document, relational terms, such as second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter

What is claimed is:

1. A system comprising:
  a graphical user interface for enabling an access device associated with a mortgage originator to receive real property transaction information regarding a prospective real estate transaction from the mortgage originator;
  a data set of title insurance pricing information for a set of two or more corresponding title insurance companies, wherein in at least one of the title insurance companies is associated with an indication of acceptance of an agreement to honor title insurance quotes based on its corresponding title insurance pricing information for a predetermined amount of time; and
  a server including a processor, the server configured to respond to the real property transaction information and at least a portion of the title pricing information in the data set by providing two or more title insurance price quotations to the access device for presentation on the graphical user interface, wherein each title insurance price quotation includes an indication of the name of a corresponding title insurance company.

2. The system of claim 1, further comprising:
  a processor configured to automatically update the data set of title insurance pricing information, wherein updating includes automatically accessing one or more title insurance company data sets, retrieving title insurance pricing information from each title insurance company data set, and updating the data set of title insurance pricing information based on the retrieved title insurance pricing information; or
  a second graphical user interface configured to enable manual update of the data set of title insurance pricing information by authorized employees of title insurance companies.

3. The system of claim 1, wherein the title insurance pricing information includes underwriter insurance cost data for one or more title insurance underwriter companies, wherein each of the title insurance underwriter companies is associated with one or more title insurance companies.

4. The system of claim 1:
  wherein the graphical user interface is configured such that each one of the title insurance pricing quotations is selectable via a user of the access device to invoke display of its corresponding pricing details; and
  wherein the graphical user interface includes includes a user-selectable feature configured to cause the server to generate a representation of a closing-cost estimate document based on a selected one of the title insurance pricing quotes.

5. The system of claim 1, wherein the server includes a data set of user information, wherein each user is associated with a set of one or more title company preferences, and wherein the server is configured to cause a listing of the title insurance price quotations in an order based on one or more of the title company preferences for the user.

6. The system of claim 5, wherein the data set of user information includes count information for a number of title quotations initiated by each user, and wherein the graphical user interface includes a display region for indicating a total estimated time savings for using the system, with the total estimated time savings based on the count information and a user provided estimate of conventional title pricing wait or processing time for a single transaction.

7. The system of claim 1, further comprising a data set of two or more title company user reviews, with each user review associated with one of the title insurance companies and wherein the graphical user interface is configured to present one or more of the title company user reviews in association with a title price quotation for a title insurance company corresponding to the title price quotation.

8. The system of claim 1, wherein the access device includes a personal computer, a tablet computer, a desktop computer, a laptop computer, a smart phone, or a personal digital assistant.

9. A system comprising:
  a processor responsive to received information regarding a prospective real estate transaction to at least partially define on a display device coupled to the processor via an Internet connection, a graphical user interface that lists a set of two or more title insurance quotations, with each title insurance quotation associated with a respective unique title company and displayed in association with an identifier of the unique title company, wherein at least one of the unique title companies is associated with an indication of its adherence to a guaranteed pricing policy for title insurance quotations; and
  wherein the processor is responsive to selection of one of the two or more title insurance quotations, for communicating, via an Internet connection, notification of the selected quotation to the title company associated with the one of the title insurance quotations.

10. The system of claim 9, wherein the graphical user interface is configured to:

display the set of two or more title insurance quotations as an ordered list; and wherein at least one of the title insurance quotations is displayed in association with a promotional offer from the title insurance company associated with the title insurance quotation; and with a performance rating based on one or more user reviews.

11. The system of claim 9:

wherein the information regarding a prospective real estate transaction, is associated with a user;

wherein the system includes a data set of user preferences logically associated with the user, the data set including a set of one or more preferred title companies; and wherein the list includes a first listed set of one or more title insurance quotations, which are listed before one or more other listed title insurance quotations, with each of the first listed insurance quotations associated with one of the set of preferred title companies.

12. The system of claim 9, wherein the processor is responsive to user selection of one of the set of two or more title insurance quotations, to generate a digital HUD settlement statement based on the selected one of the title insurance quotations and the received information regarding the prospective real estate transaction.

13. The system of claim 12, wherein the display device is part of a personal computer, a tablet computer, a desktop computer, a laptop computer, a smart phone, or a personal digital assistant.

14. A method comprising:

receiving, via an Internet connection, information regarding a prospective real estate transaction from a mortgage originator;

in response to the received information regarding the prospective real estate transaction, causing a processor to at least partially define on a display device coupled to it via an Internet connection, a graphical user interface that lists a set of two or more title insurance quotations, with each title insurance quotation associated with a respective unique title company and displayed in association with an identifier of the unique title company, wherein at least one of the unique title companies is associated with an indication of its adherence to a guaranteed pricing policy for title insurance quotations; and in response to user selection of one of the two or more title insurance quotations via the defined and displayed graphical user interface, communicating, via an Internet connection, notification of the selected quotation to the title company associated with the one of the title insurance quotations.

15. The method of claim 14:

wherein the information regarding the prospective real estate transaction was entered via a registered user of a system which stores user title company preference information; and wherein the method further comprises displaying the set of two or more title insurance quotations as an ordered list, with one or more of first listed title insurance quotations including quotes based on the user title company preference information.

16. The method of claim 14 further comprising updating a time savings indicator logically associated with the identifier, with the time saving indicator indicating an amount of time saved by using the ordered list as compared to using a manual process.

17. The method of claim 14, further comprising displaying the set of two or more title insurance quotations as an ordered list, with at least one of the title insurance quotations is displayed in association with a promotional offer from the title insurance company associated with the title insurance quotation; or with a performance rating based on one or more user reviews.

18. The method of claim 15, further comprising displaying at least one title insurance quotation for title company that is not preferred by the registered user before the first listed title quotations based on the preference information, wherein the title company that is not preferred by the registered user has paid a promotional fee to be listed before the first listed title quotations.

19. The method of claim 15, wherein one or more of the title companies associated with the user preference information is associated with a stored indicator of its acceptance of an agreement to honor title insurance quotes based on its corresponding title insurance pricing information for a predetermined amount of time.

20. The method of claim 19, wherein the indicator is updated based on detected acceptance of a terms-of-use agreement for a website.

* * * * *